United States Patent [19]

Hill

[11] Patent Number: 5,413,453

[45] Date of Patent: May 9, 1995

[54] NUT SHAKER

[75] Inventor: Daryl G. Hill, Yakima, Wash.

[73] Assignee: Orchard-Rite Ltd., Inc., Yakima, Wash.

[21] Appl. No.: 51,676

[22] Filed: Apr. 23, 1993

[51] Int. Cl.$^6$ .................................................. B66C 1/42
[52] U.S. Cl. ...................................... 414/729; 414/753; 56/340.1
[58] Field of Search ............... 414/729, 753; 56/340.1, 56/333, DIG. 9, DIG. 19

[56] References Cited

U.S. PATENT DOCUMENTS

| | | | |
|---|---|---|---|
| 3,780,510 | 12/1973 | Tompkins | 56/340.1 |
| 4,128,986 | 12/1978 | Santarelli | 56/340.1 |
| 4,254,608 | 3/1981 | Friday | 56/340.1 |
| 4,768,332 | 9/1988 | Bizzini | 56/340.1 |
| 4,893,458 | 1/1990 | Compton | 56/340.1 |

Primary Examiner—Donald W. Underwood
Attorney, Agent, or Firm—Jacobson, Price, Holman & Stern

[57] ABSTRACT

A shaking head is slidably mounted on a carriage which extends perpendicular to a boom connected to a tractor. The shaking head is reciprocally mounted on the carriage so as to move towards and away from trees located along the side of the tractor. The carriage is secured to a hollow sleeve which is rotatably and removably mounted on a rod projecting from the boom section.

9 Claims, 8 Drawing Sheets

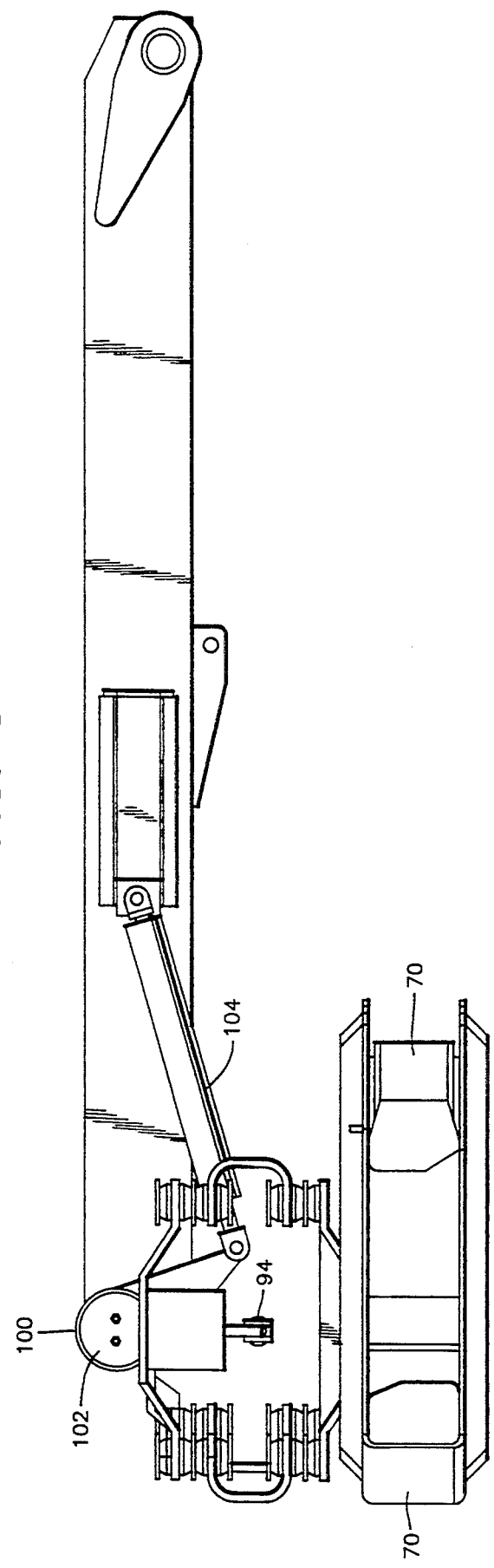

NUT SHAKER

FIELD OF THE INVENTION

This invention relates to a tractor-driven nut shaker that extends perpendicular to a boom attached to the tractor. A shaking head of the nut shaker is slidably mounted on a carriage so as to grab a tree with its jaws and shake nuts from the tree.

BACKGROUND OF THE INVENTION

Currently, the nut industry uses a machine called a "monoboom" shaker for shaking of nuts from trees. An exemplary monoboom shaker is shown in FIG. 1 and is generally illustrated at 20.

The nut shaker 20 includes a tractor 21, a boom section 22 extending in a direction of travel of the tractor. Two head support arms 24 are mounted on a hollow sleeve 23. The hollow sleeve 23 is rotatably mounted on a rod 25. Rod 25 is fixed to the boom section 22 and extends perpendicular to boom section 22.

A shaker head 26 is connected to head support arms 24 by rubber mounts (not shown). The shaker head 26 includes jaws 32 which are movable towards and away from each other.

The ends 26 of the arms 24 are mounted to the piston and cylinder support section 28 by piston and cylinder assemblies, schematically shown by lines 30. The support section 28 is fixed to the boom section 22.

By actuation of the piston cylinder assembly schematically represented at 30, the shaker head 26 is allowed to tilt and roll with respect to boom section 22 by rotation of sleeve 23 about rod 25. The shaker head extends in a direction of travel of the tractor and in the direction of the longitudinal axis of the boom section 22.

For the shaking of trees, the nut shaker 20 as shown in FIG. 2 is driven between rows of trees 34 and rows of trees 36. Initially, the tractor 21 is driven in a line extending parallel to the rows of trees 34, 36. The tractor is then turned towards a tree as shown in FIG. 2 and the jaws 32 opened and then closed about a tree so as to shake the tree and force the fall of nuts from the tree.

The operator then opens the jaws of the shaking head and reverses the direction of the tractor 21. The operator then straightens out the direction of travel of the nut shaker so as to again proceed parallel to the direction of rows of trees 34 and 36 until turning into another tree and grasping the tree to repeat the procedure for producing the fall of nuts.

Under certain conditions, the maneuvering of the nut shaker 20 shown in FIGS. 1 and 2 is unacceptable to the grower. For instance, when the tree rows are close together and each of the trees of each row are planted close together in their respective row, it becomes difficult to maneuver the tractor with its forward extending boom section and shaker head.

It then becomes necessary to undergo the enormous expense of building a specialized machine 40 as shown in FIG. 3 having an overall length 42 which is substantially less than its width 44. Extending from the tractor is a shaker head 46 which moves in and out in the direction of arrow 48 so as to engage and shake a tree by clamping jaws 50. To contact an adjacent tree, the tractor 40 is driven in the direction of arrow 52 with the operator of the tractor facing perpendicular to the line of travel 52 as represented by the arrow 54.

SUMMARY OF THE INVENTION

By the present invention, difficulties encountered by prior known nut shaking machines and specially manufactured machines have been overcome by the use of a modification to existing monoboom shakers. Existing monoboom shakers are modified by removal of the shaker head and substitution of a shaker head on a carriage so that the shaking head extends perpendicular to the machine direction of travel and perpendicular to the boom section connected to the tractor.

The shaking head is slid in and out on a carriage which extends perpendicular to the boom section. The carriage is mounted on a hollow sleeve which can fit on the rod projecting perpendicularly from the boom section of an existing monoboom shaker. The same tractor and boom can thereby be used from a traditional monoboom shaker and modified by the present invention at a minimum cost so that the shaker head extends perpendicular to the boom section to accommodate various needs of nut farmers.

By the present invention, a shaking head is slidably mounted on a carriage which extends perpendicular to a boom connected to a tractor. The shaking head is reciprocally mounted on the carriage so as to move towards and away from trees located along the side of the tractor. The carriage is secured to a hollow sleeve which is rotatably and removably mounted on a rod projecting from the boom section.

By advancement of the tractor in a direction parallel to a row of trees, the trees are accessible by the shaking head of the nut shaker. This prevents the need for extensive maneuvering of the tractor to obtain access to a nut tree or to build an expensive, specialized tractor so as to gain access to trees when the separation between rows of trees is limited.

It is therefore an object of the present invention to replace a shaking head of a monoboom shaker with a shaking head slidable on a carriage extending perpendicular to a boom section of the monoboom shaker.

It is another object of the present invention to replace a shaking head of a monoboom shaker with a shaking head slidable on a carriage extending perpendicular to a boom section with the boom section extending in the same direction as the direction of travel of the tractor to which it is mounted.

It is still yet another object of the present invention to replace a shaking head of a monoboom shaker with a shaking head slidable on a carriage extending perpendicular to a boom section with the boom section extending in the same direction as the direction of travel of the tractor to which it is mounted so as to operate a tractor in a restricted width area between rows of nut trees.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 8 is an end view of a shaking head slidably mounted on a carriage which extends from a boom section.

DETAILED DESCRIPTION OF THE PREFERRED EMBODIMENTS

Figure 1:
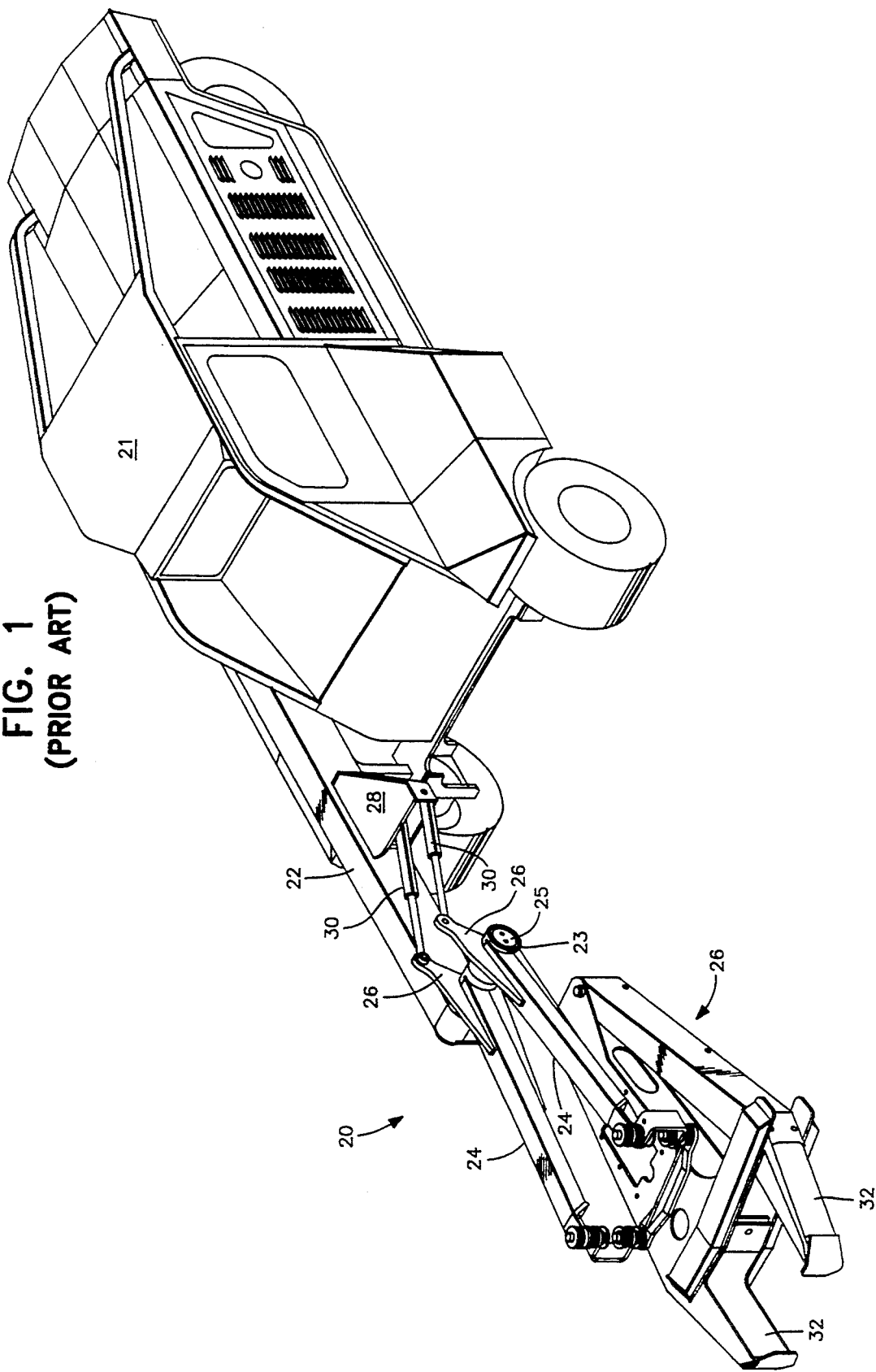
FIG. 1 is a schematic view of a known monoboom shaker.
Figure 2:
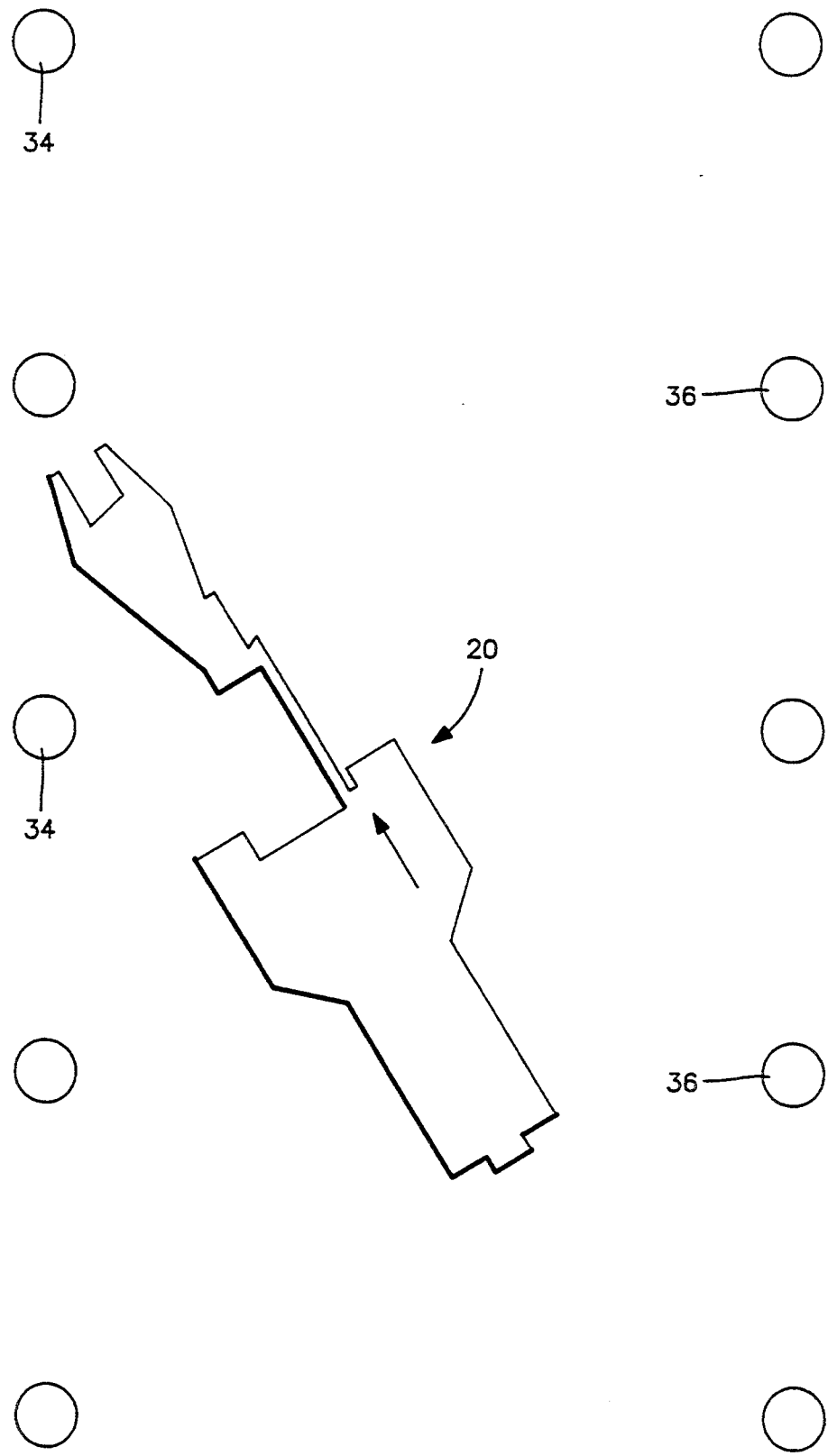
FIG. 2 schematically illustrates the monoboom shaker of FIG. 1 engaging a nut tree.
Figure 3:
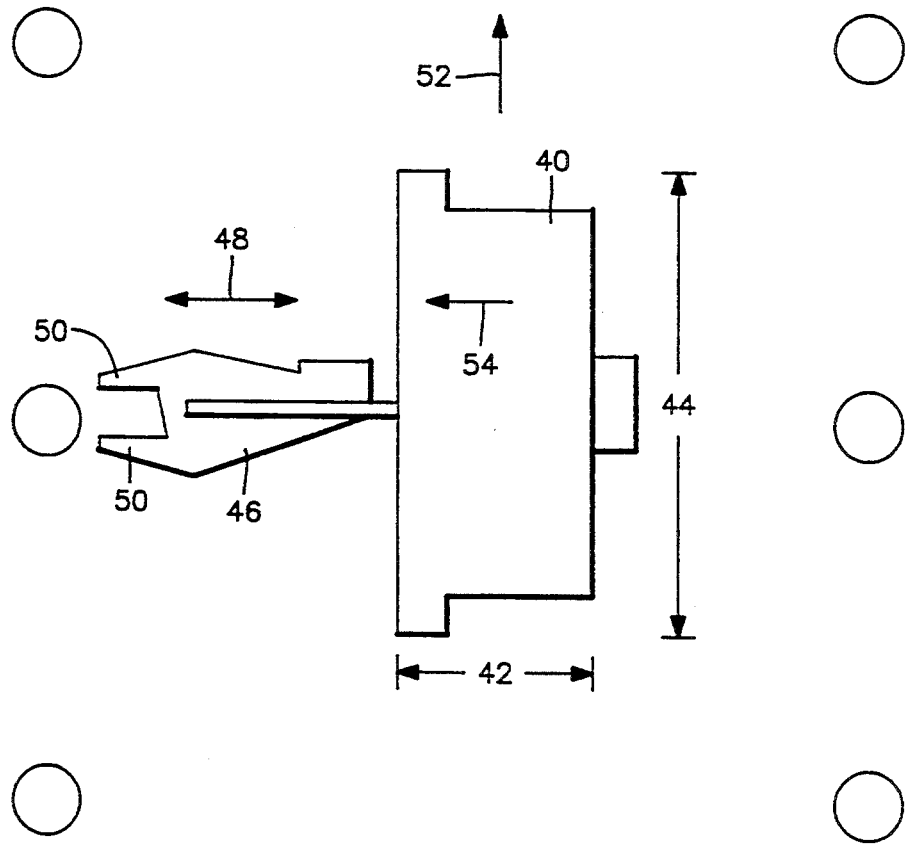
FIG. 3 is a schematic representation of a specialized nut shaker built to move between narrow rows of nut trees.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general and to FIGS. 4 through 9 in particular, a nut shaker embodying the teachings of the subject invention is generally designated as 60. With reference to its orientation in FIG. 1, the nut shaker 60 includes a tractor 62 having a boom section 64 mounted thereon, extending in a direction of travel of the tractor 62. The tractor and boom section are part of a traditional monoboom shaker.

Extending perpendicular to the boom section 64 is a rod 102. Rotatably mounted on the rod 102 is a sleeve 100 to which is secured a carriage 66 by bracket 98. At the end of the carriage is mounted a shaking head 68.

The shaking head includes two jaws 70 which are movable towards and away from each other for grasping of a nut tree. The shaking head is mounted on a slidable member 72. Secured to the slidable member 72 is a bracket 74 and a bracket 76. Secured to the shaking head 68 is a bracket 78 shaped the same as bracket 74. Between brackets 74 and 78 are two C-shaped brackets 80 having holes 82 at opposite ends for securing rubber mounts 84 between the brackets 74 and 80 and between the brackets 80 and 78.

Figure 4:
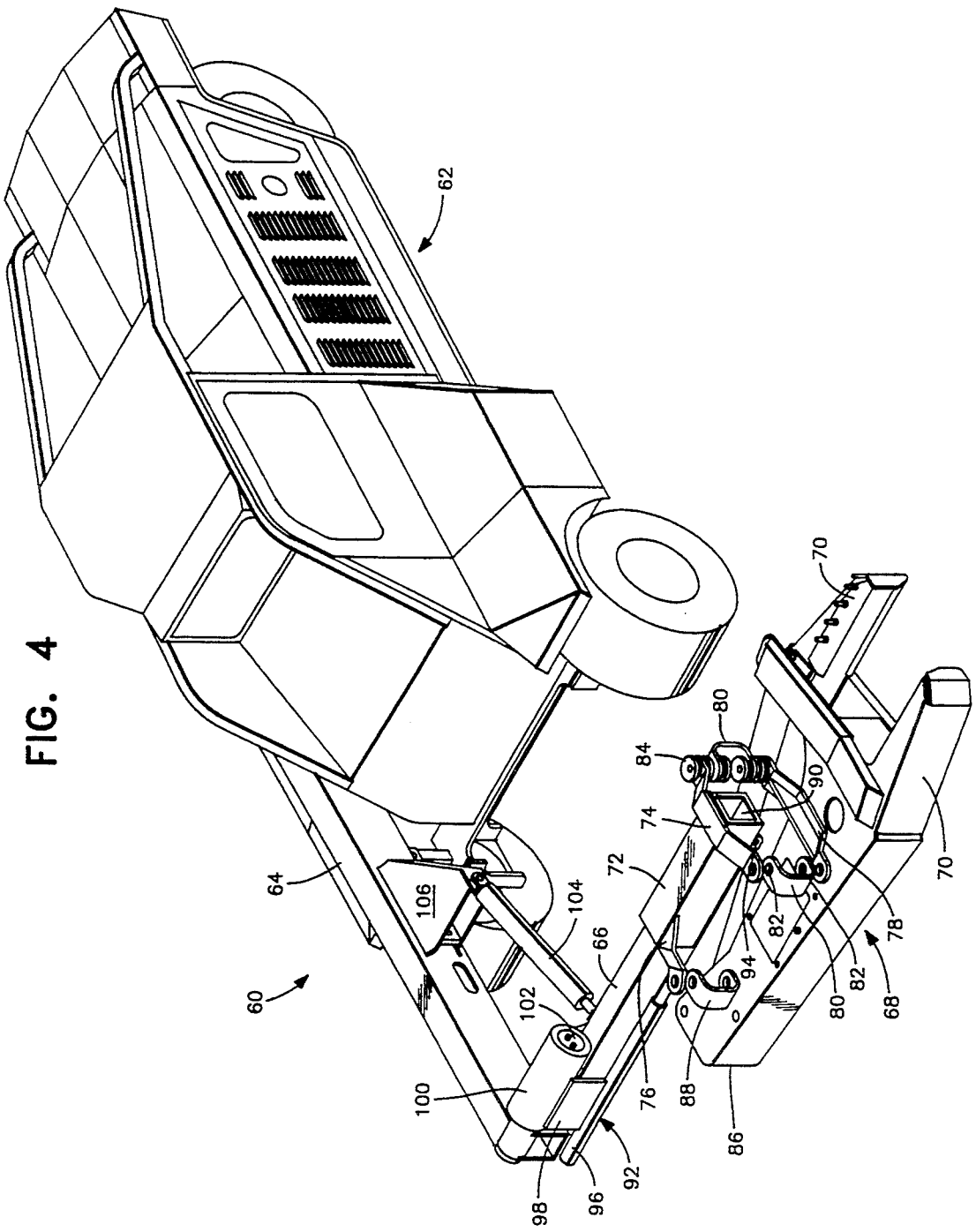
FIG. 4 illustrates a nut shaker of the present invention having a shaking head extending perpendicular to the direction of travel of the tractor and perpendicular to a boom section onto which it is mounted.
Figure 5:
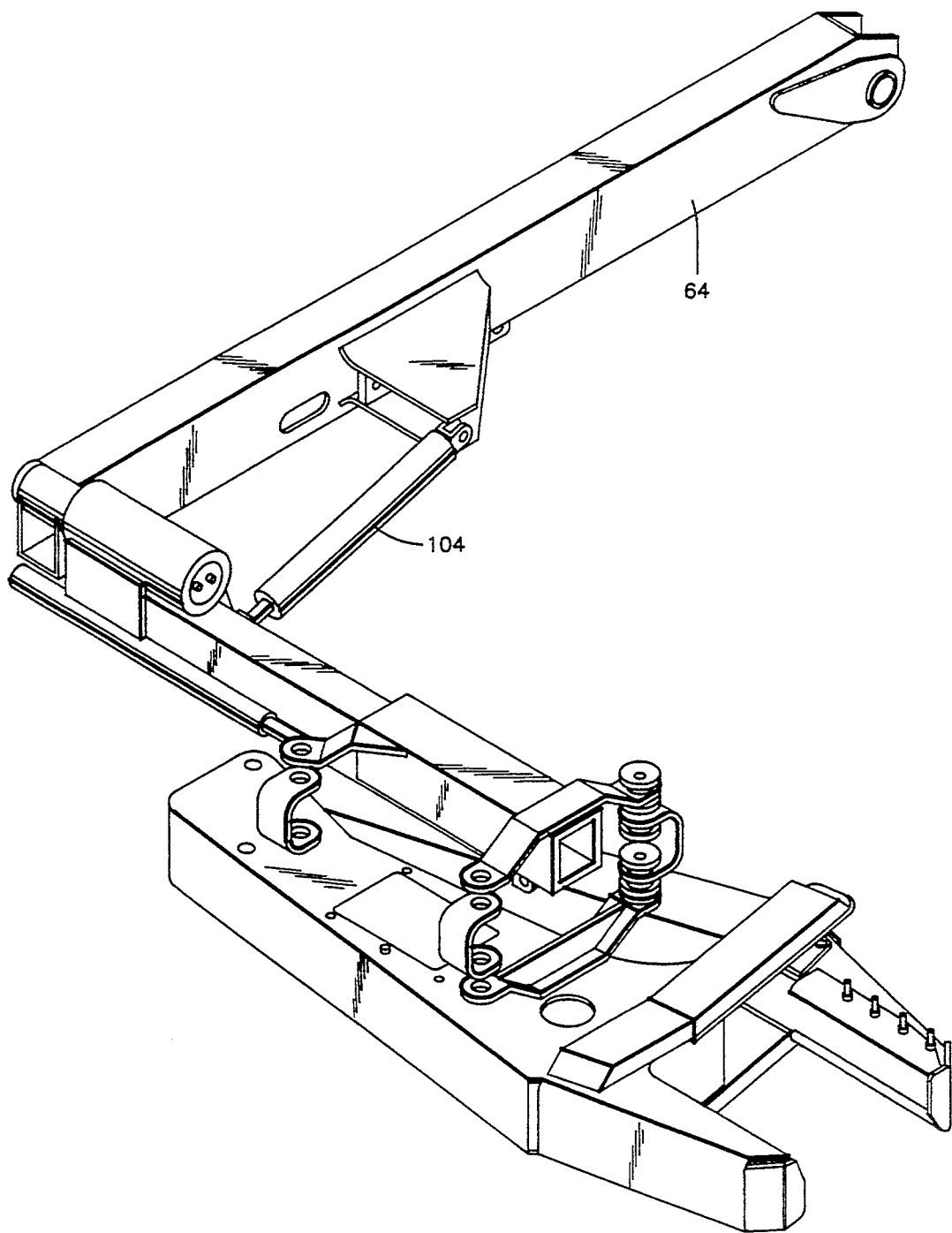
FIG. 5 illustrates a boom section, carriage and shaking head.
Figure 6:
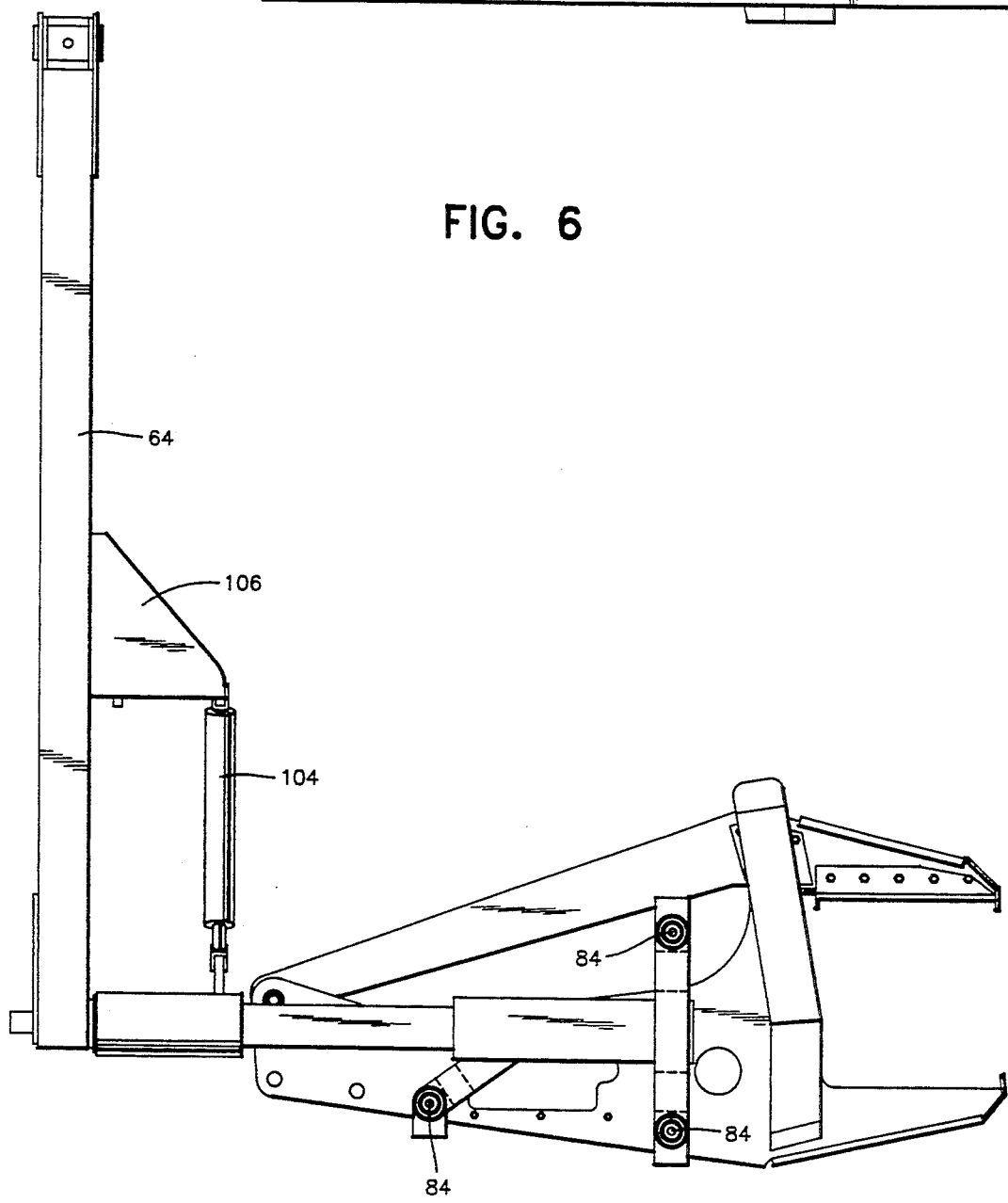
FIG. 6 is a plan view of the boom section, carriage and shaker head.

In FIG. 4, the right-hand interconnection of rubber mounts and brackets is shown and the left-hand connection is omitted to illustrate the alignment of the various holes of the brackets interconnected by the rubber mounts 84. The rubber mounts 84 at all connector points are shown in FIGS. 6 through 8.

Figure 7:
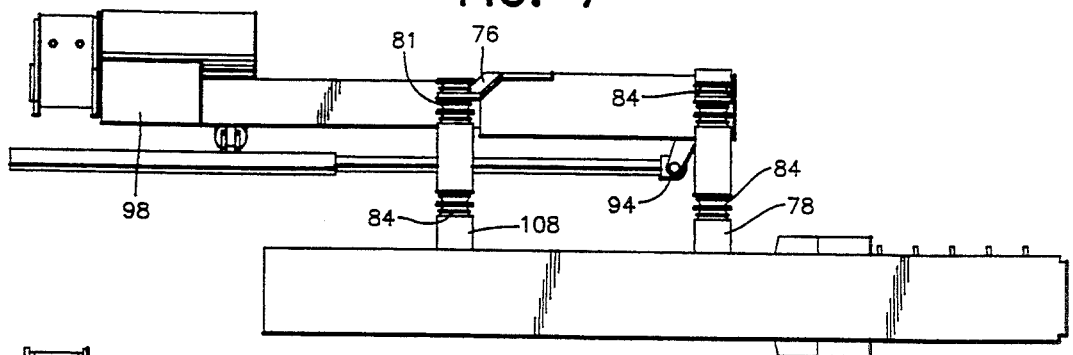
FIG. 7 is a side view of a shaker head mounted on a carriage with an end of the boom section shown.

Towards the rear 86 of the shaking head, a bracket 108, similar to bracket 78, is shown in FIG. 7 so as to illustrate the interconnection with the C-shaped clip 88. The bracket 108 secures the rear of the shaking head to the slidable member 72 through bracket 76 and clip 88.

The sliding member 72 includes a square-shaped opening 90 for receipt of the square shaped carriage 66. A piston and cylinder assembly 92 engages the sliding member 72 at connector 94, shown in FIGS. 7 and 8, with its opposite end 96 of the cylinder connected to bracket 98 fixed in position to rotatable cylinder 100 which rotates about interior rod 102. By extension of the piston of the piston cylinder assembly 92, the sliding member 72 is slid along the carriage 66 for extension and retraction of the shaking head towards a tree.

The lateral angle of the shaking head is adjusted by extension and retraction of piston cylinder assembly 104 which is anchored at one end to anchor plate 106, as represented by section 28 in FIG. 1, and at its opposite end to the carriage 66. The entire carriage and shaking head assembly may be rotated about interior rod 102 about which exterior sleeve 100 rotates with the carriage.

Figure 9:
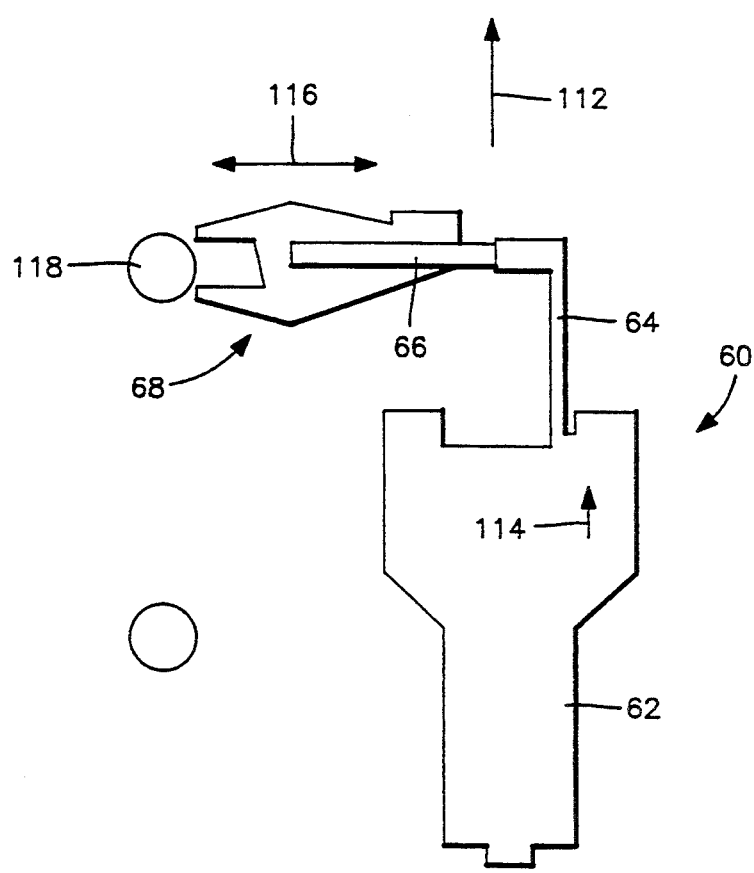
FIG. 9 schematically illustrates the use of the present invention between a row of nut trees for shaking of the trees.

As shown in FIG. 9, the nut shaker 60 proceeds in the direction of travel parallel to the rows of nut trees 120 and 122 as shown by arrow 112. The operator sitting in the tractor 62 faces in the direction of arrow 114 which is also parallel to arrow 112.

The boom section 64 extends in the direction of travel of the tractor. The carriage 66 and the shaking head 68 extend perpendicular to the boom section 64 and the direction of travel 112 of the tractor 62. The shaking head 68 is slidably mounted on the carriage 66 for reciprocal movement in the direction of arrow 116 for engagement with a tree 118 of the row of trees 120. The tractor may thereby be moved down the middle between rows of trees 120 and 122 with no deviation from a straight line of travel to access and shake each of the successive trees in the row 120. The tractor is then turned around and moved between the rows of trees 122, in the opposite direction of travel from engaging row of trees 120, to access each successive tree in row 122 by again travelling in a straight line.

Having described the invention, many modifications thereto will become apparent to those skilled in the art to which it pertains without deviation from the spirit of the invention as defined by the scope of the appended claims.

I claim:

1. A nut shaker apparatus comprising:
   a tractor,
   a boom section mounted on said tractor and extending in a direction of travel of said tractor,
   a carriage rotatably mounted on said boom section about an axis perpendicular to said boom section,
   means for rotating said carriage about said axis perpendicular to said boom section,
   a member slidably mounted on said carriage, and
   a shaking head for engaging a nut tree and shaking the tree, said shaking head being mounted on said slidably member for movement of said shaking head along said carriage in a direction perpendicular to said boom section and perpendicular to the direction of travel of said tractor.

2. A nut shaker apparatus according to claim 1, further comprising means for removably mounting said carriage on said boom section.

3. A nut shaker apparatus according to claim 2, wherein said means for removably mounting said carriage on said boom section is located between said carriage and said boom section and comprises a hollow sleeve slidably mounted on a rod connected to said boom section, said rod extending perpendicular to said boom section, said carriage being rotatable about the longitudinal axis of said rod.

4. A nut shaker apparatus according to claim 1, wherein said means for tilting said carriage with respect to said boom section is mounted at one end on said boom section and at an opposite end on said carriage.

5. A nut shaker apparatus according to claim 1, wherein means for sliding said slidable member with respect to said carriage is mounted at one end on said carriage and at an opposite end on said slidable member.

6. A nut shaker comprising:
   a tractor,
   a boom section mounted on said tractor and extending in a direction of travel of said tractor,
   a rod mounted on said boom section perpendicular to said boom section,
   a sleeve rotatably mounted on said rod,
   a carriage mounted on said sleeve,
   a member slidably mounted on said carriage,
   a shaking head for engaging a nut tree and shaking the tree, said shaking head being mounted on said member for movement of said shaking head along said carriage in a direction perpendicular to said boom section and perpendicular to the direction of travel of said tractor.

7. A nut shaker apparatus according to claim 6, further comprising means for removably mounting said carriage on said rod mounted on said boom section.

8. A nut shaker apparatus according to claim 6, wherein means for tilting said carriage with respect to said boom section is mounted at one end on said boom section and at an opposite end on said carriage.

9. A nut shaker apparatus according to claim 6, wherein means for sliding said slidable member with respect to said carriage is mounted at one end on said carriage and at an opposite end on said slidable member.

* * * * *